US009522573B2

(12) United States Patent
Nishiwaki et al.

(10) Patent No.: US 9,522,573 B2
(45) Date of Patent: Dec. 20, 2016

(54) PNEUMATIC TIRE

(71) Applicant: Sumitomo Rubber Industries, Ltd., Kobe-shi, Hyogo (JP)

(72) Inventors: Takashi Nishiwaki, Kobe (JP); Yosuke Matsuda, Kobe (JP)

(73) Assignee: SUMITOMO RUBBER INDUSTRIES, LTD., Kobe-Shi (JP)

( * ) Notice: Subject to any disclaimer, the term of this patent is extended or adjusted under 35 U.S.C. 154(b) by 401 days.

(21) Appl. No.: 14/045,228

(22) Filed: Oct. 3, 2013

(65) Prior Publication Data
US 2014/0137999 A1 May 22, 2014

(30) Foreign Application Priority Data
Nov. 20, 2012 (JP) ................ 2012-254518

(51) Int. Cl.
| | | |
|---|---|---|
| B60C 11/12 | (2006.01) | |
| B60C 11/11 | (2006.01) | |
| B60C 11/03 | (2006.01) | |
| B60C 11/04 | (2006.01) | |

(52) U.S. Cl.
CPC ............ *B60C 11/03* (2013.01); *B60C 11/0304* (2013.04); *B60C 11/0309* (2013.04); *B60C 11/04* (2013.01); *B60C 11/12* (2013.01); *B60C 2011/0346* (2013.04); *B60C 2011/0381* (2013.04); *B60C 2011/0383* (2013.04); *B60C 2011/0386* (2013.04); *B60C 2011/0388* (2013.04); *B60C 2011/1213* (2013.04); *B60C 2011/133* (2013.04)

(58) Field of Classification Search
CPC ............... B60C 2011/0383; B60C 2011/0388; B60C 2011/0391; B60C 11/033
See application file for complete search history.

(56) References Cited

U.S. PATENT DOCUMENTS

| | | | | |
|---|---|---|---|---|
| 5,031,680 A | * | 7/1991 | Kajikawa ............... | B60C 11/11 |
| | | | | 152/209.18 |
| 2009/0229721 A1 | | 9/2009 | Ikeda | |
| 2010/0186861 A1 | * | 7/2010 | Ishiguro ............. | B60C 11/0306 |
| | | | | 152/209.25 |

(Continued)

FOREIGN PATENT DOCUMENTS

JP        2012-188080      * 10/2012

OTHER PUBLICATIONS

English machine translation of JP2012-188080, dated Oct. 2012.*
Extended European Search Report dated Mar. 11, 2014 for Application No. 13183734.6.

*Primary Examiner* — Steven D Maki
*Assistant Examiner* — Robert Dye
(74) *Attorney, Agent, or Firm* — Birch, Stewart, Kolasch & Birch, LLP (57) ABSTRACT

A pneumatic tire is provided in a tread portion with a center land portion which is defined between center main grooves and whose top surface has a certain area and a maximum axial width of 15% to 19% of a tread width. The center land portion is provided with axial sipes and recesses. The recess extends from the center main groove toward the tire equator, and has a depth of 60% to 80% of the depth of the center main groove. The total area of the recesses is 5% to 9% of the area of the above-mentioned top surface. The center land portion is formed as a substantially continuous rib.

7 Claims, 4 Drawing Sheets

(56) References Cited

U.S. PATENT DOCUMENTS

| | | | | |
|---|---|---|---|---|
| 2010/0206446 A1* | 8/2010 | Oizumi | ............... | B60C 11/0306 152/209.18 |
| 2012/0273108 A1* | 11/2012 | Yoshida | .................. | B60C 11/12 152/209.25 |
| 2014/0230979 A1* | 8/2014 | Matsuda | .................. | B60C 11/12 152/209.18 |

* cited by examiner

PNEUMATIC TIRE

BACKGROUND OF THE INVENTION

The present invention relates to a pneumatic tire, more particularly to a tread pattern suitable for winter tire and all season tire capable of improving ice performance, snow performance and drainage in a well balanced manner.

Winter tire is required to have good wet performances on wet roads as well as good performances on icy roads and snowy roads.

It is has been proposed to increase the ground contacting area of the tire tread portion in order to increase the friction of the tire tread portion and also increase the tread pattern rigidity to thereby improve the performances on icy roads. In this technique, however, as the ground contacting area of the tire tread portion is increased, the volume and width of tread grooves are decreased accordingly. Therefore, there is a possibility that the performances on snowy roads such as the shearing force of trodden snow and self-removal of snow as well as performances on wet roads such as drainage are deteriorated.

SUMMARY OF THE INVENTION

It is therefore, an object of the present invention to provide a pneumatic tire, in which the ice performance, snow performance and drainage are improved in a well balanced manner.

According to the present invention, a pneumatic tire comprises a tread portion provided on each side of the tire equator with a center main groove extending continuously in the tire circumferential direction so that there is defined between the center main grooves a center land portion whose top surface has a certain area and a maximum axial width in a range of from 15% to 19% of a tread width, wherein the center land portion is provided with a plurality of sipes having a width of not more than 1.5 mm, extending axially of the tire and arranged circumferentially of the tire at intervals, the center land portion is further provided with a plurality of recesses arranged circumferentially of the tire at intervals, extending from at least one of the center main grooves toward the tire equator, and each having a depth in a range of from 60% to 80% of the depth of the center main groove, the total area of the recesses is in a range of from 5% to 9% of the above-mentioned area of the top surface of the center land portion, and the center land portion is formed as a rib substantially continuous in the tire circumferential direction.

The pneumatic tire according to the present invention may be provided with the following features (1)-(6):
(1) the center main groove is a zigzag groove made up of alternate long segments and short segments shorter than the long segments, and with respect to the tire circumferential direction, the long segments are inclined to one axial direction, and the short segments are inclined to the other axial direction;
(2) each of the recesses is formed at one end of one of the long segments so as to have a sidewall surface smoothly continuous to a groove-sidewall surface of the short segment adjacent to the long segment concerned;
(3) the recesses include those extending from one of the center main grooves toward the tire equator, and those extending from the other main groove toward the tire equator;
(4) each of the recesses has a substantially trapezoidal shape at its top;
(5) the dimension of the trapezoidal shape is gradually decreased toward the tire equator when measured in parallel with a widthwise center line of the center main groove at its bottom; and
(6) at least four sipes are disposed per one circumferential pitch of the recesses, and the sipes have a width of from 0.2 to 1.0 mm.

In this application including specification and claims, various dimensions, positions and the like of the tire refer to those under a normally inflated unloaded condition of the tire unless otherwise noted.

The normally inflated unloaded condition is such that the tire is mounted on a standard wheel rim and inflated to a standard pressure but loaded with no tire load.

The undermentioned normally inflated loaded condition is such that the tire is mounted on the standard wheel rim and inflated to the standard pressure and loaded with the standard tire load.

The standard wheel rim is a wheel rim officially approved or recommended for the tire by standards organizations, i.e. JATMA (Japan and Asia), T&RA (North America), ETRTO (Europe), TRAA (Australia), STRO (Scandinavia), ALAPA (Latin America), ITTAC (India) and the like which are effective in the area where the tire is manufactured, sold or used. The standard pressure and the standard tire load are the maximum air pressure and the maximum tire load for the tire specified by the same organization in the Air-pressure/Maximum-load Table or similar list. For example, the standard wheel rim is the "standard rim" specified in JATMA, the "Measuring Rim" in ETRTO, the "Design Rim" in TRA or the like. The standard pressure is the "maximum air pressure" in JATMA, the "Inflation Pressure" in ETRTO, the maximum pressure given in the "Tire Load Limits at Various Cold Inflation Pressures" table in TRA or the like. The standard load is the "maximum load capacity" in JATMA, the "Load Capacity" in ETRTO, the maximum value given in the above-mentioned table in TRA or the like. In case of passenger car tires, however, the standard pressure and standard tire load are uniformly defined by 180 kPa and 88% of the maximum tire load, respectively.

The tread width TW is the axial distance between the tread edges Te measured in the normally inflated unloaded condition of the tire.

The tread edges Te are the axial outermost edges of the ground contacting patch of the tire (camber angle=0) in the normally inflated loaded condition.

DESCRIPTION OF THE PREFERRED EMBODIMENTS

Embodiments of the present invention will now be described in detail in conjunction with the accompanying drawings.

The pneumatic tire according to the present invention comprises a tread portion 2, a pair of axially spaced bead portions each with a bead core therein, a pair of sidewall portions extending between the tread edges Te and the bead portions, a carcass extending between the bead portions, and a tread reinforcing belt disposed radially outside the carcass in the tread portion as usual.

The pneumatic tire is a studless tire used as a winter tire or all season tire.

Figure 1:
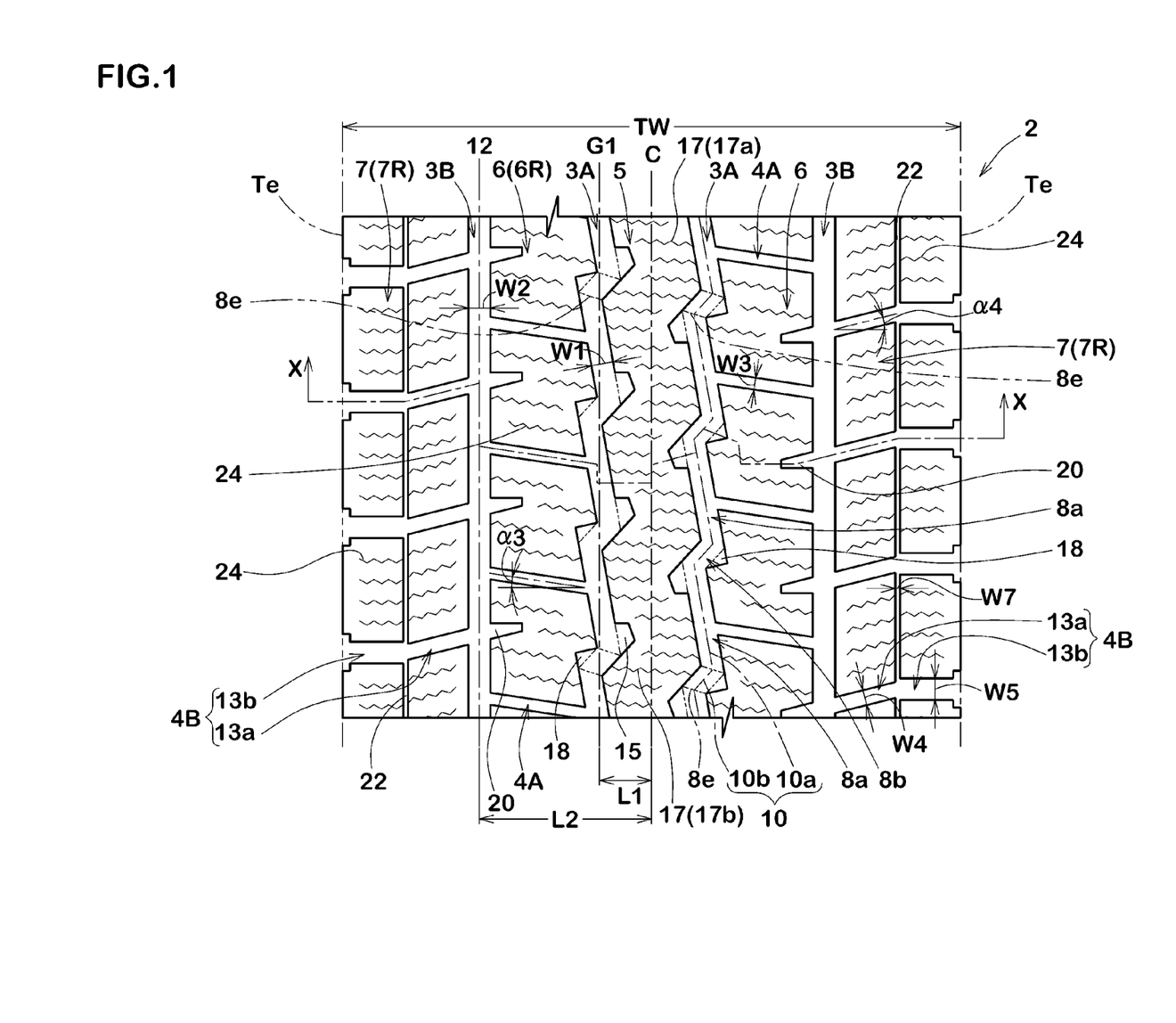
FIG. 1 is a developed view of a part of the tread portion of a pneumatic tire as an embodiment of the present invention.

The tread portion 2 is provided on each side of the tire equator C with an axially inner center main groove 3A and an axially outer shoulder main groove 3B each extending continuously in the tire circumferential direction, and a plurality of middle axial grooves 4A extending between the center main groove 3A and the shoulder main groove 3B, and a plurality of shoulder axial grooves 4B extending between the shoulder main groove 3B and the tread edge Te. In the tread portion 2, therefore, there are defined a circumferentially continuously extending center rib 5 between the center main grooves 3A, two rows 6R of circumferentially arranged middle blocks 6 divided by the center main grooves 3A, the shoulder main grooves 3B and the middle axial grooves 4A, and two rows 7R of circumferentially arranged shoulder blocks 7 divided by the shoulder main grooves 3B, the tread edges Te and the shoulder axial grooves 4B.

The tread pattern in this embodiment is substantially symmetric with respect to any point on the tire equator C except for variation due to variable pitching which may be employed in arranging the axial grooves.

The center main groove 3A in this embodiment is a zigzag groove made up of alternate long segments 8a and short segments 8b shorter than the long segments 8a.
With respect to the tire circumferential direction, the long segments 8a are inclined toward one axial direction, and the short segments 8b are inclined toward the other axial direction in order that the axial component of the edges of the center main groove 3A is increased to thereby increase the drive power and braking force, and also the shearing force of the trodden snow packed into the center main groove 3A is increased to thereby improve the snow performance.

The angle of the widthwise center line 10 at the groove bottom, of the center main groove 3A defines the angle of the center main groove 3A.

In this embodiment, the widthwise center line 10a at the groove bottom, of the long segment 8a is straight, and the widthwise center line 10b at the groove bottom, of the short segment 8b is straight.

In FIG. 1, reference sign 8e denotes a boundary line between the long segment 8a and the short segment 8b for the purpose of explanation only.

Figure 2:
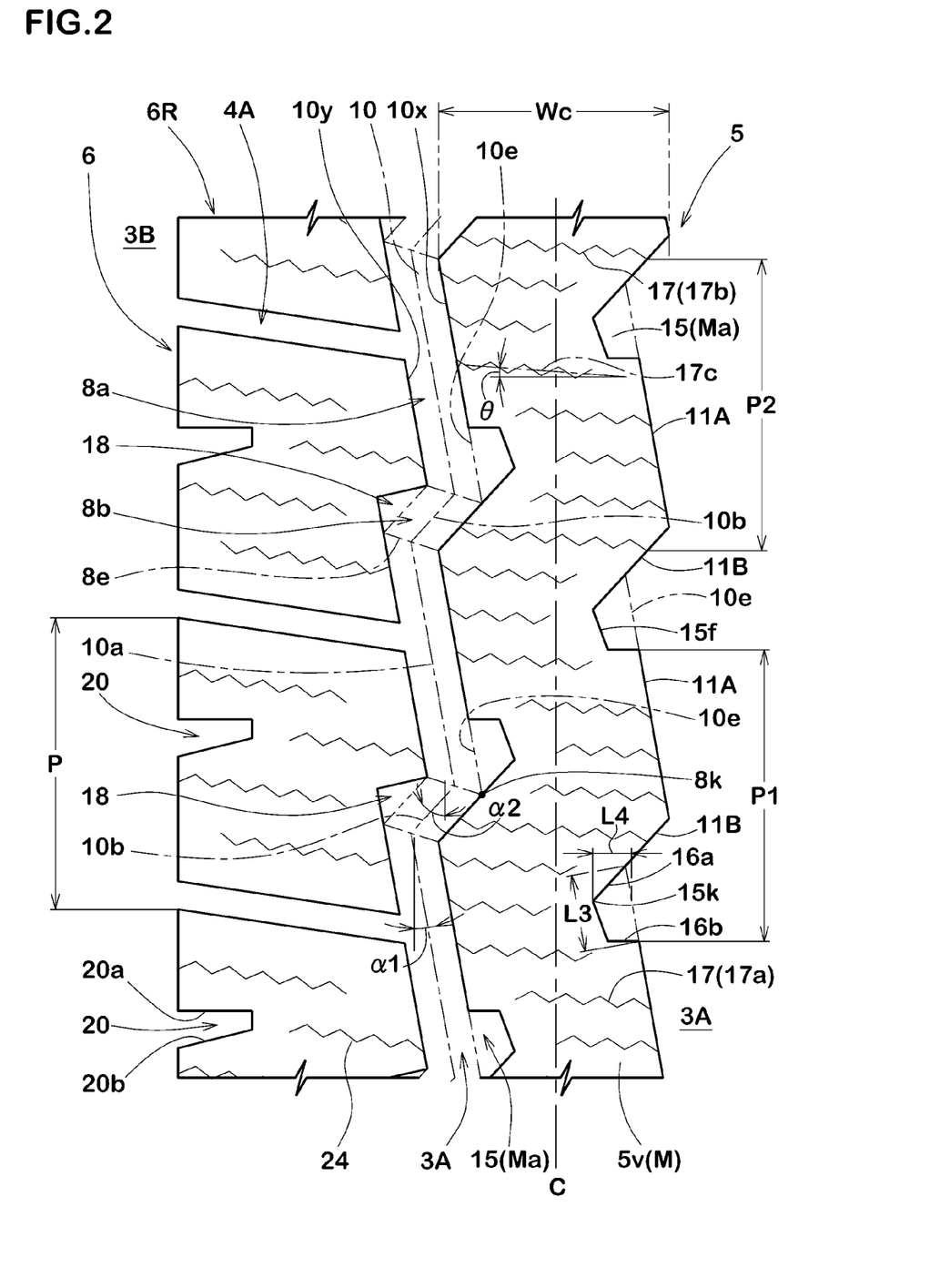
FIG. 2 is an enlarged view of the tread portion showing the center rib and the middle block row.

As shown in FIG. 2, the axially inner edge 10x of the center main groove 3A, which is the boundary between the center main groove 3A and the center rib 5, does not include the boundaries between the center rib 5 and notches and the like whose depths are less than the depth D1 of the center main groove 3.

Similarly, the axially outer edge 10y of the center main groove 3A, which is the boundaries between the center main groove 3A and the middle blocks 6, does not include the boundaries between the middle blocks 6 and notches and the like whose depths are less than the depth D1 of the center main groove 3.

The axially inner edge 10x in this embodiment comprises alternate inner long edge segments 11A and inner short edge segments 11B shorter than the segments 11A.

With respect to the tire circumferential direction, the inner long edge segments 11A are inclined toward one axial direction, and the inner short edge segments 11B are inclined toward the other axial direction. Each of the segments 11B is connected to one end of one of the segments 11A.

If the angle α1 of the long segments 8a with respect to the tire circumferential direction is small, there is a possibility that the axial component of the edges decreases. If the angle α1 of the long segments 8a is large, the drainage by the center main groove 3A and self-removal of snow from the center main groove 3A become worse, and there is a possibility that the drainage and snow performance is deteriorated.

The angle α1 of the long segments 8a is preferably set in a range of not less than 5 degrees, more preferably not less than 7 degrees, and not more than 20 degrees, more preferably not more than 18 degrees.

If the angle α2 of the short segments 8b with respect to the tire circumferential direction is large, there is a possibility that the drainage by the center main groove 3A become worse. If the angle α2 of the short segments 8b is small, there is a possibility that the shearing force of the trodden snow becomes small.

The angle α2 of the short segments 8b is preferably set in a range of not less than 30 degrees, more preferably not less than 35 degrees, but not more than 60 degrees, more preferably not more than 55 degrees.

As shown in FIG. 1, the shoulder main groove 3B in this embodiment is a straight groove substantially parallel with the circumferential direction in order that water in the main groove 3B can be readily drained, and snow in the main groove 3B can be readily self-discharged, and also the middle blocks 6 and shoulders blocks 7 have high circumferential rigidities to thereby improve the ice performance.

If the depth D1, D2 and the width W1, W2 of each of the main grooves 3A and 3B are decreased, there is a possibility that the drainage and snow performance are deteriorated. If increased, the rigidities of the center rib 5 and the blocks 6 and 7 are decreased, and there is a possibility that the ice performance is deteriorated.

The width W1, W2 of the main groove 3A, 3B is preferably set in a range of from 2% to 6% of the tread width TW.

The depth D1, D2 of the main groove 3A, 3B is preferably set in a range of from 10 to 15 mm.

In order to achieve the axial rigidities of the center rib 5 and the blocks 6 and 7 in a well balanced manner, the axial distance L1 between the center main groove 3A and the tire equator C is preferably set in a range of from 5% to 13% of the tread width TW, and the axial distance L2 between the shoulder main groove 3B and the tire equator C is preferably set in a range of from 24% to 32% of the tread width TW.

Here, the position of each main groove 3A, 3B is defined by that of the widthwise center line at the groove bottom.

When the main groove 3A, 3B is a nonlinear groove as in this embodiment, the position of the center line G1 of the amplitude of the widthwise center line 10 is used instead.

All of the middle axial grooves 4A are straight and are inclined in one direction in order to expedite the drainage from the center main groove 3A toward the shoulder main groove 3B.

If the angle α3 of the middle axial groove 4A with respect to the tire axial direction is large, the shearing force of the trodden snow becomes small, and there is a possibility that the snow performance is deteriorated. If the angle α3 is small, there is a possibility that the circumferential component of the edges can not be effectively increased.

The angle α3 of the middle axial groove 4A is preferably set in a range of not less than 3 degrees, more preferably not less than 5 degrees, but not more than 14 degrees, more preferably not more than 12 degrees.

If the width W3 and depth D3 of the middle axial groove 4A are large, there is a possibility that the rigidity of the middle block 6 decreases. If the width W3 and depth D3 of the middle axial groove 4A are small, there is a possibility that the drainage and snow performance are deteriorated.

The width W3 of the middle axial groove 4A is preferably set in a range of not less than 1.0 mm, more preferably not less than 2.0 mm, but not more than 10.0 mm, more preferably not more than 9.0 mm.

The depth D3 of the middle axial groove 4A is preferably set in a range of not less than 6.5 mm, more preferably not less than 7.0 mm, but not more than 10.0 mm, more preferably not more than 9.5 mm.

The shoulder axial groove 4B in this embodiment comprises an axially inner inclined part 13a and an axially outer non-inclined part 13b.

The axially inner inclined part 13a extends from the shoulder main groove 3B toward the tread edge Te while inclining with respect to the tire axial direction.

The axially outer non-inclined part 13b extends substantially parallel with the tire axial direction from the axially inner inclined part 13a to the tread edge Te in order to increase the shearing force of the trodden snow.

The axially inner inclined parts 13a of all of the shoulder axial grooves 4B are inclined in one direction.

The axially inner inclined part 13a and the axially outer non-inclined part 13b each extend straight in order to decrease the resistance to the drainage flow.

In this specification, the expression "substantially parallel" means that a difference within +/−10 degrees from the completely paralleled direction is allowable.

The angle α4 of the axially inner inclined part 13a with respect to the tire axial direction is preferably set in a range of not less than 10 degrees, more preferably not less than 12 degrees, but not more than 20 degrees, more preferably not more than 18 degrees.

The width W4 of the axially inner inclined part 13a is preferably set in a range of not less than 1.0 mm, more preferably not less than 2.0 mm, but not more than 10.0 mm, more preferably not more than 9.0 mm.

If the width W4 of the axially inner inclined part 13a is large, there is a possibility that the rigidity of the shoulder block 7 decreases. If the width W4 of the axially inner inclined part 13a is small, there is a possibility that the drainage is deteriorated.

In this embodiment, the width W5 of the axially outer non-inclined part 13b is more than the width W4 of the axially inner inclined part 13a in order to expedite the drainage from the axially inner inclined part 13a to the tread edge Te. Preferably, the width W5 of the axially outer non-inclined part 13b is set in a range of not less than 1.2 times, more preferably not less than 1.3 times, but not more than 2.4 times, more preferably not more than 2.3 times the width W4 of the axially inner inclined part 13a in order that the rigidity of the shoulder blocks 7 is maintained while achieving the above advantageous effect.

Figure 3:
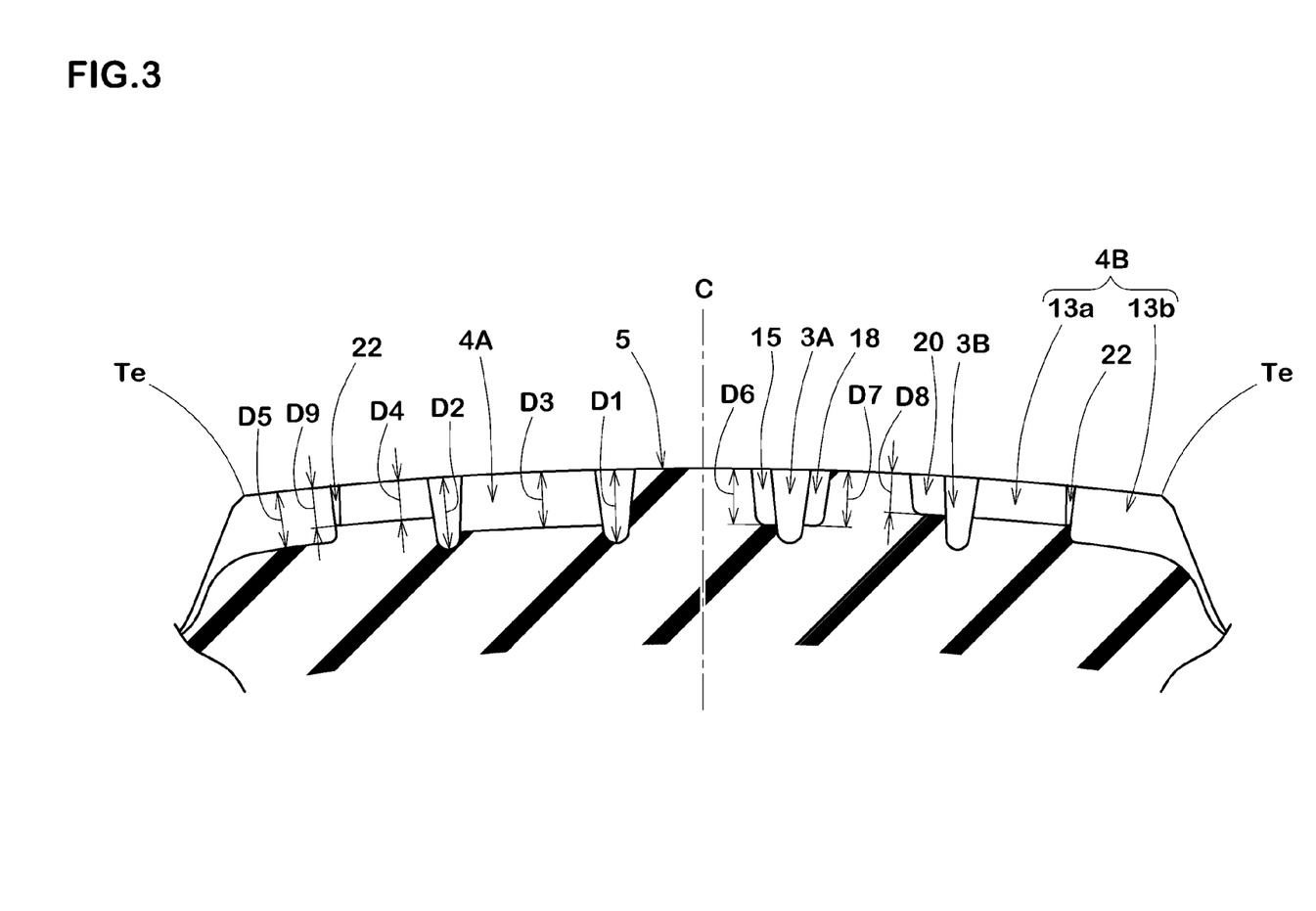
FIG. 3 is a cross sectional view of the tread portion taken along like X-X in FIG. 1.

As shown in FIG. 3, the groove depth D4 of the axially inner inclined part 13a is preferably set in a range of not less than 5.0 mm, more preferably not less than 5.5 mm, but not more than 8.0 mm, more preferably not more than 7.5 mm.

In this embodiment, the groove depth D5 of the axially outer non-inclined part 13b is set to be more than the groove depth D4 of the axially inner inclined part 13a in order to expedite the drainage from the shoulder axial groove 4B to the tread edge Te and improve the snow performance.

The groove depth D5 of the axially outer non-inclined part 13b is preferably set in a range of not less than 1.2 times, more preferably not less than 1.3 times, but not more than 1.8 times, more preferably not more than 1.7 times the groove depth D4 of the axially inner inclined part 13a.

As shown in FIG. 2, the maximum axial width Wc of the center rib 5 is set in a range of from 15% to 19% of the tread width TW. If more than 19%, the axial width of the middle block 6 or shoulder block 7 becomes small, and the cornering performance on icy road is deteriorated. Further, the width W1, W2 of the center main groove 3A or shoulder main groove 3B becomes small, and the drainage becomes worse. If less than 15%, the axial rigidity of the center rib 5 becomes small and driving/braking force on icy roads decreases.

Preferably, the maximum width Wc of the center rib 5 is not less than 16% but not more than 18% of the tread width TW.

The center rib 5 is provided with sipes 17 having a width W6 of not more than 1.5 mm.

The sipes 17 extend axially of the tire and are arranged circumferentially of the tire in order to increase the axially extending edges and thereby to improve the driving/braking force, ice performance, and straight running stability.

Further, the center rib 5 is provided with recesses 15. The recesses 15 extend toward the tire equator C from at least one of the center main grooves 3A (in this embodiment, from each of the center main grooves 3A) and have a depth D6 of less than the depth D1 of the center main groove 3A. The recess 15 terminates within the center rib 5 in order to maintain the rigidity of the center rib 5.

As the edge of such recess 15 has an axial component and a circumferential component, friction against icy road surface is increased and ice performance can be improved.

The recess 15 increases the shearing force of the trodden snow, and there by the ice performance, snow performance and drainage are improved.

The depth D6 of the recess 15 is preferably set in a range of from 60% to 80% of the depth D1 of the center main groove 3A. If more than 80%, the rigidity of the center rib 5 decreases. If less than 60%, the drainage and the shearing force of the trodden snow can not be fully improved.

Preferably, the depth D6 of the recess 15 is not less than 62% and not more than 78% of the depth D1 of the center main groove 3A.

The total Ms of the areas Ma of the top openings of the recesses 15 is set in a range of from 5% to 9% of the area M of the supposititious ground contact surface 5v of the center rib where it is assumed that there are no voids such as sipes, recesses and grooves.

In this particular embodiment, in the developed view of the ground contact surface of the center rib 5, an extended line 10e is drawn
from a part of the axially inner edge 10x of the center main groove 3A which part corresponds to each of the inner long edge segments 11A
to an end of the adjacent inner short edge segment 11B in parallel with the widthwise center line 10 at the groove bottom, of the center main groove 3A.

Therefore, by the extended line 10e, the line of the edge of the recess 15 is closed and the area Ma of the top opening of the recess 15 is defined as being surrounded by such closed loop line.

The line of the axially inner edge 10x inclusive of the extended lines 10e becomes continuous in the tire circumferential direction, and the supposititious ground contact surface 5v is defined between such circumferentially continuous lines.

If the total area Ms is less than 5% of the area M, the volume of the recess 15 becomes small, and the drainage and snow performance ate deteriorated. If the total area Ms is more than 9% of the area M, the rigidity of the center rib 5 becomes small, and the ice performance is deteriorated. Preferably, the total area Ms of the recesses 15 is set in a range of not less than 6% and not more than 8% of the area M of the supposititious ground contact surface 5v of the center rib.

Figure 4:
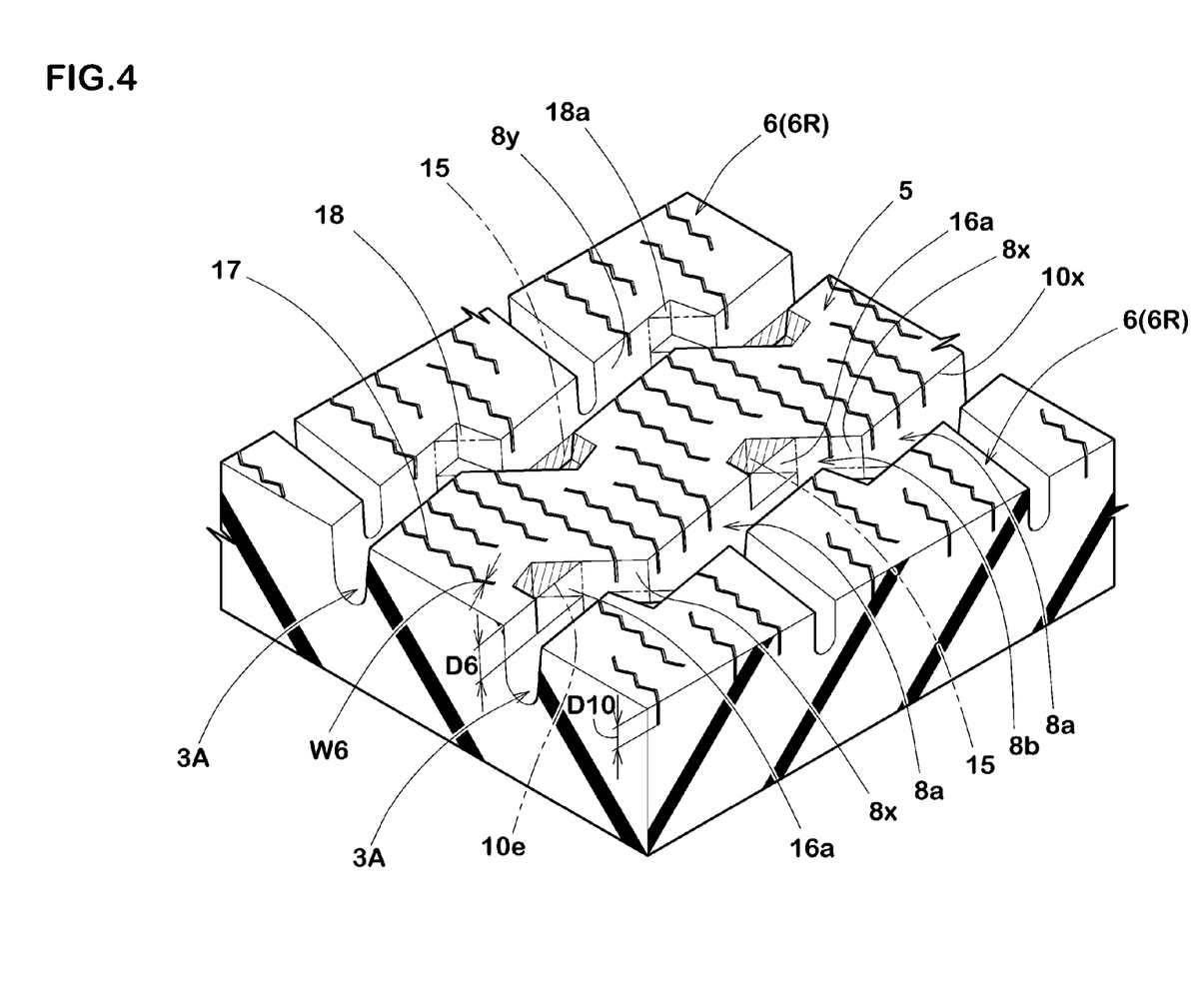
FIG. 4 is a perspective view showing the center rib and its vicinity.

As shown in FIG. 4, each of the recesses 15 is disposed at one end of one of the long segments 8a (in FIG. 2, in a tire equator side of the long segments 8a) so as to have a sidewall surface 16a smoothly continuous to the axially inner groove-sidewall surface 8x of the short segments 8b.

In this embodiment, the sidewall surface 16a of the recess 15 and the groove-sidewall surface 8x of the short segments 8b are formed by one plane in order that the relevant part of the center rib 5 is provided with rigidity, and water and snow are readily discharged from the recess 15 to the center main groove 3A.

In the supposititious ground contact surface 5v of the center rib, as shown in FIG. 2, the shape of the recess 15 is substantially trapezoidal so as to have multi-directional edge components and thereby to further improve the cornering performance on icy roads.

Here, the expression "substantially trapezoidal" means it is acceptable that the parallel sides are not exactly parallel and a small angle of less than 15 degrees is formed therebetween.

In the example shown in FIG. 1, the shorter base of the trapezoid is not exactly parallel with the widthwise center line 10a and inclined at 10 degrees with respect to the widthwise center line 10a or the longer base of the trapezoid.

The dimension L3 of the recess 15 measured in parallel with the extended line 10e is gradually decreased toward the tire equator C in order to maintain the rigidity of the center rib 5 and improve the straight running stability on icy roads.

The recesses 15 on one side of the tire equator C are circumferentially shifted from the recesses 15 on the other side of the tire equator C in order that the rigidity of the center rib 5 becomes uniform in the tire circumferential direction.

If the axial distance L4 between the axially innermost end 15 of the recess 15 and the extended line 10e is small, it is difficult to increase the drainage. If the axial distance L4 of the recess 15 is large, the area of the ground contact surface of the center rib 5 becomes small, and the rigidity of the center rib 5 is deteriorated.
Preferably, the axial distance L4 of the recess 15 is set in a range of not less than 13%, more preferably not less than 15%, but not more than 21%, more preferably not more than 19% of the maximum axial width Wc of the center rib 5.

The sidewall surface 16b of the recess 15 opposite to the sidewall surface 16a of the recess 15 extends substantially parallel with the tire radial direction in order to increase the braking force and drive power on icy roads.

At least four sipes 17 are arranged per one circumferential pitch P1 of the recesses 15 on one side in order to enhance the improvement in the driving/braking force brought about by the sipes 17.

However, if the number of the sipes 17 is increased, the rigidity of the center rib 5 becomes decreased, and there is a possibility that the ice performance is deteriorated.
Therefore, the number of the sipes 17 per one pitch P1 is preferably not less than 5, but not more than 8, more preferably not more than 7.

If the pitch P1 of the recesses 15 is large, there is a possibility that the drainage and snow performance can not be improved. If pitch P1 is small, the rigidity of the center rib 5 becomes small, there is a possibility that the ice performance can not be improved.
Therefore, the pitch P1 is preferably set in a range of not less than 10%, more preferably not less than 15%, but not more than 30%, more preferably not more than 25% of the tread width TW.

The width W6 (see FIG. 4) of the sipe 17 is preferably not less than 0.2, more preferably not less than 0.4 mm, but not more than 1.0 mm, more preferably not more than 0.8 mm. The depth D10 of the sipe 17 is preferably set in a range of from 3.0 to 12.0 mm.

The sipes 17 in this embodiment include a semi-open sipe 17a whose one end is opened to the main groove 3A and the other end terminates within the center rib 5, and an open sipe 17b whose both ends are opened to the center main grooves 3A.

It is preferable that four to eight semi-open sipes 17a are disposed per one circumferential pitch P2 of the open sipes 17b in order to increase the driving/braking force brought about by the center rib 5 and improve the straight running stability on icy roads. If the number of the open sipes 17b is increased, there is a possibility that the rigidity of the center rib 5 is decreased.

The sipes 17 in this embodiment are zigzag in order to increase the circumferential component of the edges and thereby improve the cornering performance on icy roads. However, the configuration of the sipe 17 is not limited to a zigzag configuration. A straight configuration, wavy configuration namely gently curved zigzag configuration and the like can be used alone or in combination.

In order to improve the straight running stability on icy road, the angle θ of the sipes 17 with respect to the tire axial direction is preferably not more than 10 degrees, more preferably not more than 7 degrees.
When the sipe 17 is zigzag as in this embodiment, the angle of the amplitude center line 17c of the zigzag is used instead.

The sipes 17 disposed in the center rib 5 are not connected to the recesses 15 in order not to decrease the rigidity of the center rib 5 and not to deteriorate the ice performance.

The middle blocks 6 are each provided with an axially inner middle notch 18 and an axially outer middle notch 20.

The axially outer middle notch 20 extends axially inwardly from the shoulder main groove 3B and terminates within the middle block 6.

The axially inner middle notch 18 extends axially outwardly from the center main groove 3A and terminates within the middle block 6.

The depth D7 of the axially inner middle notch 18 is less than the depth D1 of the center main groove 3A.

The axially inner middle notch 18 and the axially outer middle notch 20 provide edges having both axial and circumferential components. This increases the frictional against road surface and improves the ice performance. Water film existing between the middle block 6 and the road surface can be led to the center main groove 3A and the shoulder main groove 3B by the axially inner middle notch 18 and the axially outer middle notch 20.

The axially inner middle notch 18 is disposed in the short segment 8b in order to reduce the resistance to the drainage flow at the short segment 8b and thereby to improve the drainage of the center main groove 3A.
In this embodiment, the edge 18c of the axially inner middle notch 18 defines the entire length of one of the edges of the short segment 8b.
The edge 18c of the axially inner middle notch 18 in this example is v-shaped.

As shown in FIG. 4, the axially inner middle notch 18 in this example has a sidewall surface 18a smoothly continuous to the axially outer groove-sidewall surface 8y of the long segment 8a in order to smoothly lead water from the axially inner middle notch 18 to the center main groove 3A. In this example, the groove-sidewall surface 8y and the sidewall surface 18a are defined by one plane.

As shown in FIG. 2, the axially outer middle notch 20 has a non-inclined edge 20a extending axial inwardly from the shoulder main groove 3B in substantially parallel with the tire axial direction, and an inclined edge 20b extending axial inwardly from the shoulder main groove 3B while inclining towards one circumferential direction in order that the edge has both of axial component and circumferential component and thereby further improve the ice performance.

As shown in FIG. 3, the depth D7 of the axially inner middle notch 18 is preferably set in a range of not less than 55%, more preferably not less than 57%, but not more than 65%, more preferably not more than 63% of the depth D1 of the center main groove 3A.
If the depth D7 of the axially inner middle notch 18 is large, the rigidity of the middle block 6 becomes small, and there is a possibility that the uneven wear resistance is deteriorated. If the depth D7 of the axially inner middle notch 18 is small, there is a possibility that the drainage can not be improved.

For similar reasons, the depth D8 of the axially outer middle notch 20 is preferably set in a range of not less than 55%, more preferably not less than 57%, but not more than 65%, more preferably not more than 63% of the depth D2 of the shoulder main groove 3B.

As shown in FIG. 1, each shoulder region axially outside the shoulder main groove 3B is provided with a shoulder narrow groove 22 extending straight continuously in the tire circumferential direction so as to cross each of the shoulder blocks 7 in order to improve the cornering performance by the increased circumferential edges.

If the depth D9 of the shoulder narrow groove 22 is large, the axial rigidity of the shoulder block 7 becomes small, and there is a possibility that the uneven wear resistance is deteriorated. If the depth D9 of the shoulder narrow groove 22 is small, there is a possibility that the drainage decreases. Preferably, the depth D9 of the shoulder narrow groove 22 is set in a range of not less than 5.0 mm, more preferably not less than 5.5 mm, but not more than 8.0 mm, more preferably not more than 7.5 mm.

The middle blocks 6 and shoulder blocks 7 are each provided with axially extending sipes 24 in order to further improve the ice performance.

The sipes 24 in this embodiment are the above-explained semi-open type sipe in order to maintain the block rigidity.

The width of the sipe 24 is preferably set in a range of from 0.2 to 1.0 mm. The depth of the sipe 24 is preferably set in a range of from 3.0 to 12.0 mm.

Comparison Tests

Based on the tread pattern shown in FIG. 1, pneumatic tires were prepared and tested for the drainage, ice performance, and snow performance.
Common specifications are as follows:
Tire size: 195/80R15 (rim size: 15X6.0J)
Tread width TW: 155 mm
<Main Grooves 3A, 3B>
  depth D1,D2: 12.0 mm
<Axial Grooves>
  middle axial groove depth D3: 8.5 mm
  inclined part depth D4: 6.5 mm
  non-inclined part depth D5: 10.0 mm
  middle notch depth D7: 8.5 mm
  middle notch depth D8: 6.5 mm
<Shoulder Narrow Groove>
  depth D9: 6.5 mm
<All Sipes>
  depth: 8.0 mm
  width: 0.4 mm
Other specifications are shown in Table 1.
In Table 1, Cont. is a control tire which was the same as the FIG. 1 tire excepting that the recesses 15 were not provided.
<Drainage Test>
A test car (2700 cc four-wheel-drive car) provided on all four wheels with test tires was run on a wet asphalt road with a water depth of 2-5 mm along a circle whose circumference was about 300 meters, and the time for running three laps was measured. The results are indicated in Table 1 by an index based on the control tire being 100, wherein the larger the index, the higher the resistance to aquaplane.
Under 95 is not acceptable.
<Ice Performance (Braking and Cornering) Test>
The test car was run on an ice-covered road along a circle whose circumference was about 400 meters, and the time for running three laps was measured.
Further, the test car was run on the ice-covered road along a straight line, and the braking distance was measured by applying a wheel-lock brake when running at the speed of 30 km/h.

The time for running three laps is expressed by an index based on the control tire being 50. The braking distance is expressed by an index based on the control tire being 50. The two index values are shown in Table 1, wherein the larger the index number, the better the performance. Under 95 is not acceptable.
<Snow Performance Test>
The test car was run on a snow road covered with trodden snow, and snow performance was evaluated by the test driver based on the steering response, braking force, traction force and the like. The results are indicated in Table 1 by an index based on the control tire being 100, wherein the larger the index, the better the performance. Under 95 is not acceptable.

From the test results, it was confirmed that the tires according to the present invention can be improved in the drainage, ice performance and snow performance in a well balanced manner.

TABLE 1

| Tire | Cont. | Ex. 1 | Ref. 1 | Ex. 2 | Ex. 3 | Ref. 2 | Ref. 3 |
|---|---|---|---|---|---|---|---|
| center rib max. width Wc/TW (%) *1 | 17 | 17 | 13 | 15 | 19 | 22 | 17 |
| recess depth D6/D1 (%) *2 | — | 70 | 70 | 70 | 70 | 70 | 50 |
| total recess area Ms/gross area M (%) | — | 7 | 7 | 7 | 7 | 7 | 7 |

TABLE 1-continued

| Tire | | | | | | | |
|---|---|---|---|---|---|---|---|
| ice performance | 100 | 108 | 95 | 105 | 109 | 110 | 95 |
| snow performance | 100 | 105 | 100 | 106 | 102 | 95 | 101 |
| drainage | 100 | 100 | 105 | 100 | 100 | 90 | 105 |
| Tire | Ex. 4 | Ex. 5 | Ref. 4 | Ref. 5 | Ex. 6 | Ex. 7 | Ref. 6 |
| center rib max. width Wc/TW (%) *1 | 17 | 17 | 17 | 17 | 17 | 17 | 17 |
| recess depth D6/D1 (%) *2 | 60 | 80 | 85 | 70 | 70 | 70 | 70 |
| total recess area Ms/gross area M (%) | 7 | 7 | 7 | 4 | 5 | 9 | 11 |
| ice performance | 101 | 109 | 110 | 110 | 109 | 104 | 95 |
| snow performance | 102 | 101 | 100 | 101 | 101 | 106 | 100 |
| drainage | 101 | 100 | 95 | 95 | 100 | 101 | 100 |

*1 TW: tread width
*2 D1: depth of center main groove

The invention claimed is:

1. A pneumatic tire comprising:
a tread portion with a center main groove extending continuously in the tire circumferential direction provided on each side of the tire equator so that there is defined between the center main grooves a center land portion having a top surface that has a certain area and a maximum axial width in a range of from 15% to 19% of a tread width,
wherein
the center land portion is provided with a plurality of sipes having a width of not more than 1.5 mm, extending axially of the tire and arranged circumferentially of the tire at intervals,
the center land portion is further provided with a plurality of recesses arranged circumferentially of the tire at intervals, extending from the center main grooves toward the tire equator and terminating within the central land portion, each of the recesses having a depth in a range of from 60% to 80% of the depth of the center main groove,
the total area of the recesses is in a range of from 5% to 9% of said certain area of the top surface of the center land portion,
the center land portion is provided with said sipes and said recesses only, and formed as a rib substantially continuous in the tire circumferential direction,
each of the center main grooves is a zigzag groove made up of alternate long segments and short segments shorter than the long segments, the long segments inclined to one axial direction and the short segments inclined to the other axial direction with respect to the tire circumferential direction,
each of the recesses is formed at one end of one of the long segments so as to have a sidewall surface smoothly continuous to a groove-sidewall surface of the short segment adjacent to the long segment concerned,
the tread portion is further provided on each side of the tire equator with a shoulder main groove and a plurality of middle axial grooves,
the shoulder main groove is a straight groove disposed on the axially outside of said center main groove, and extending continuously in the tire circumferential direction,
each of the middle axial grooves is a straight groove and extends between the center main groove and the shoulder main groove so as to define a row of circumferentially arranged middle blocks therebetween,
each of the middle blocks has
edges on both sides in the tire circumferential direction which are straight,
an axially inner edge which is crank-shaped and made up of two long segments and one short segment therebetween, and
an axially outer edge which is straight, and
each of the middle blocks is provided in a midportion of the axially outer edge with a notch extending from the shoulder main groove and terminating within the middle block.

2. The pneumatic tire according to claim 1, wherein
at least four sipes are disposed per one circumferential pitch of the recesses on each side of the center land portion, and
the sipes have a width of from 0.2 to 1.0 mm.

3. The pneumatic tire according to claim 1, wherein each of the recesses has a substantially trapezoidal shape at its top.

4. The pneumatic tire according to claim 3, wherein the dimension of the trapezoidal shape is gradually decreased toward the tire equator when measured in parallel with a widthwise center line of the center main groove at its bottom.

5. The pneumatic tire according to claim 1, wherein the tread portion is provided on each side of the tire equator with a plurality of shoulder axial grooves extending between the shoulder main groove and the tread edge so as to define circumferentially arranged shoulder blocks therebetween.

6. The pneumatic tire according to claim 5, wherein the tread portion is provided on each side of the tire equator with a shoulder narrow groove extending straight and continuously in the tire circumferential direction across each of the shoulder blocks.

7. The pneumatic tire according to claim 6, wherein
each of the shoulder axial grooves comprises an axially inner part extending straight from the shoulder main groove to the shoulder narrow groove, and an axially outer part extending straight from the shoulder narrow groove to the tread edge,
the axially outer part is substantially parallel with the tire axial direction, and
the axially inner part is inclined with respect to the tire axial direction.

* * * * *